Figure 1:
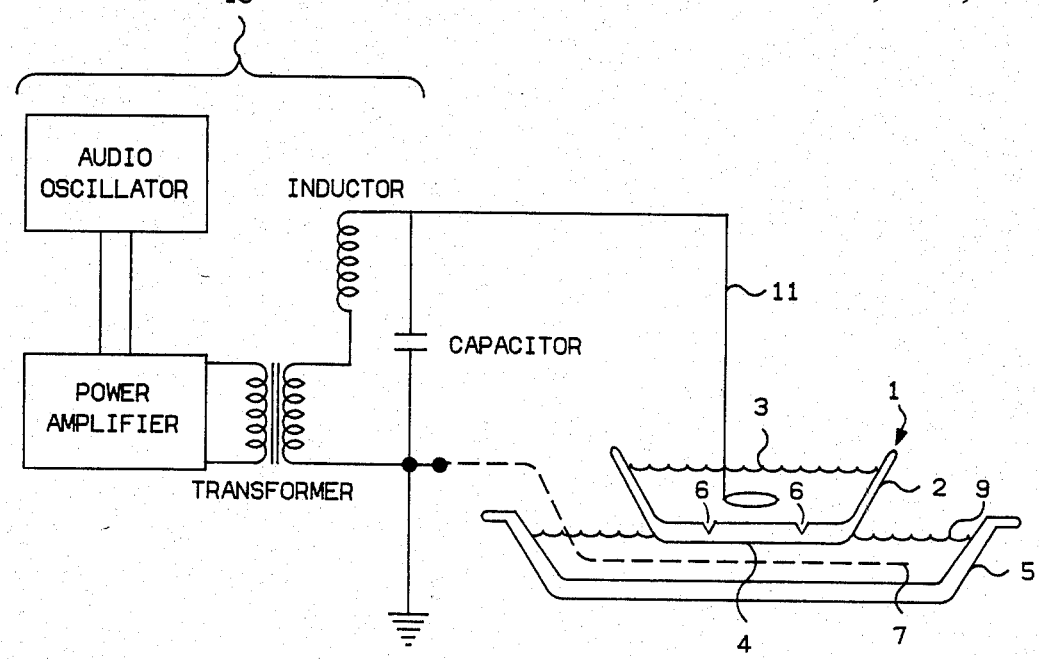

United States Patent [19]

Johnson et al.

[11] Patent Number: 4,535,116

[45] Date of Patent: Aug. 13, 1985

[54] INHIBITION OF WATER TREEING IN POLYMERS OF ETHYLENE

[75] Inventors: Timothy W. Johnson; Dennis S. Banasiak, both of Bartlesville, Okla.

[73] Assignee: Phillips Petroleum Company, Bartlesville, Okla.

[21] Appl. No.: 536,055

[22] Filed: Sep. 26, 1983

[51] Int. Cl.$^3$ ................................................ C08K 5/05
[52] U.S. Cl. .................................... 524/385; 524/528; 528/495
[58] Field of Search ................ 524/385, 528; 528/495

[56] References Cited

U.S. PATENT DOCUMENTS

| | | | |
|---|---|---|---|
| 2,754,278 | 7/1956 | Wilson et al. | 524/385 |
| 3,076,776 | 2/1963 | Findlay | 524/385 |
| 3,976,612 | 8/1976 | Kaji et al. | 524/385 |
| 4,144,202 | 3/1979 | Ashcraft et al. | 524/570 |
| 4,206,260 | 6/1980 | McMahon | 525/387 |

*Primary Examiner*—Joseph L. Schofer
*Assistant Examiner*—N. Sarofim
*Attorney, Agent, or Firm*—A. W. Umphlett

[57] ABSTRACT

A method for inhibiting formation of water trees in objects formed from compositions of polymers of ethylene used in dielectric applications having a density in a range above 0.92 g/cc as determined by ASTM D1505 by addition of an inhibiting amount of an aliphatic, primary, monohydric, branched chain alkanol of about 9 to about 30 carbon atoms. A composition inhibited in the formation of water trees in objects formed from compositions of polymers of ethylene used in dielectric applications having a density in a range above 0.92 g/cc and an inhibiting amount of an aliphatic, primary, monohydric, branched chain alkanol of about 9 to about 30 carbon atoms.

16 Claims, 2 Drawing Figures

INHIBITION OF WATER TREEING IN POLYMERS OF ETHYLENE

BACKGROUND OF THE INVENTION

This invention relates to polymers of ethylene. In one of its aspects this invention relates to the formation of water trees in objects formed from compositions of polymers of ethylene used in dielectric applications. In still another aspect of this invention it relates to polymers of ethylene having densities in the medium to high density range, e.g., above about 0.92 g/cc. In still another aspect of this invention it relates to additives for use with polymers of ethylene.

Water treeing can be described as the formation of tree-shaped arrays of microscopic, conductive channels in insulation materials subjected to a combination of high voltage and moisture. The water tree phenomenon is well known and is described in U.S. Pat. No. 4,144,202, incorporated here by reference. Water trees appear to be a serious and growing problem in underground residential distribution electrical cables.

Inhibition of the formation of electrical trees in low density polyethylene (LDPE) has been studied and U.S. Pat. No. 4,206,260 discloses the use of straight and branched chain alcohols having 6 to 24 carbon atoms, most preferably 8 to 12 carbon atoms, as electrical tree inhibitors for low density polyethylene. Low density can be defined as polyethylene having a plurality of branches of various lengths and a density of up to about 0.92 g/cc.

The polymers of ethylene with which this invention is concerned have densities in the medium and high density range—above about 0.92 g/cc, preferably in a range of about 0.935 to about 0.960 g/cc, most preferably in a range of about 0.935 to about 0.950 g/cc. Medium density polyethylene (MDPE) and high density polyethylene (HDPE) are contrasted to LDPE, not only in having a higher density but also in being more linear in nature and exhibiting substantially less structural branching.

It is an object of this invention to provide a method for inhibiting the formation of water trees in objects formed from compositions of polymers of ethylene used in dielectric applications having densities in the medium to high density range. It is still another object of this invention to provide compositions containing polymers of ethylene in the medium to high density range and compounds capable of inhibiting the formation of water trees in objects formed from compositions of polymers of ethylene used in dielectric applications of the compositions.

Other aspects, objects and the various advantages of this invention will become apparent upon reading the specification and the appended claims.

STATEMENT OF THE INVENTION

According to this invention, there is provided a method for inhibiting formation of water trees in objects formed from compositions of polymers of ethylene used in dielectric applications which comprises admixing a polymer of ethylene having a density in a range above about 0.92 g/cc as determined by ASTM D1505 with an amount of an aliphatic, primary, monohydric, branched chain alcohol of about 9 to about 30 carbon atoms, said amount sufficient to inhibit formation of water trees in objects formed from compositions of polymers of ethylene used in dielectric applications of the polymer.

In another embodiment of the invention, a composition is provided which is an admixture of a polymer of ethylene having a density in a range above about 0.92 g/cc and an amount to inhibit the formation of water trees in objects formed from compositions of polymers of ethylene used in dielectric applications of an aliphatic, primary, monohydric, branched chain alkanol of about 9 to about 30 carbon atoms.

The alcohols employed in our invention are most preferably 2-alkyl-alkanols which can be expressed as

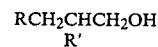

wherein R and R' are the same or different linear or branched chain alkyl groups with each group containing from about 3 to about 20 carbon atoms such that the total number of carbon atoms in R and R' together can range from about 12 to about 27.

Examples of such alkanols include 2-butyloctanol-1,2-heptyldodecanol-1,2-octylundecanol-1,2-octyldodecanol-1,2-decyldodecanol-1,2-dodecyloctadecanol-1,2-octyleicosanol-1, and the like and mixtures. Presently preferred compounds include 2-octylundecanol-1,2-octyldodecanol-1, and mixtures of 2-alkyl-1-alkanols wherein the total number of carbon atoms per molecule ranges from about 18 to about 28 and wherein the total number of carbon atoms in R and R' together ranges from 15 to 25.

Alcohols useful in the invention can be made by the Guerbet process which comprises condensing two primary alcohols, each having a methylene in the alpha-position under alkaline conditions at elevated temperatures, e.g., about 80° C., to about 400° C. A catalyst such as an insoluble lead salt such as lead silicates, lead titanates, lead zirconates, lead germanates and lead hafnates can be employed. Such a process is disclosed, for example, in U.S. Pat. No. 4,011,273, incorporated here by reference.

The quantity of 2-alkylalkanol admixed with the medium to high density polyethylene to produce the dielectric compositions of this invention can range from an amount sufficient to be effective, e.g., 0.5 weight percent of the total composition up to about 10 weight percent, more preferably from about 1.5 to about 5 weight percent, most preferably about 2.5 to about 5 weight percent.

The dielectric compositions can be evaluated for performance by employing any convenient accelerated test method. The method employed in this invention consists of (1) subjecting molded specimens, each containing 8 conical depressions, to treeing conditions for a specified time, usually 24 hours; (2) punching out discs, each containing 1 depression, from each specimen; (3) dyeing the discs; (4) sectioning the discs; and (5) measuring the dimensions of the trees as described later. In each instance, 16 measurements are made from a sample to average out variations in tree size and shape which tend to result from microscopic differences in the material around each specimen.

The test method can be best understood in conjunction with the drawing which is a schematic diagram of the test apparatus.

Referring to the drawing in which

FIG. 1 is a schematic, cutaway side view of the test apparatus and

Figure 2:
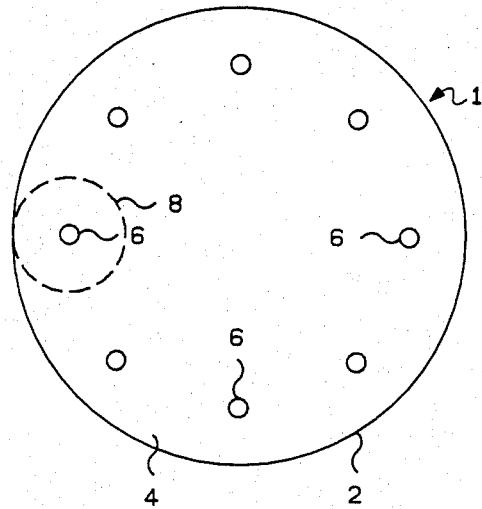

FIG. 2 is a top view of a test specimen, the various compositions can be injection molded using a mold temperature of about 50° C. to 70° C. to make the test specimens (1) in FIGS. 1 and 2 which somewhat resemble Petree dishes in shape. The dish (1) is about 70 mm in diameter having an upstanding wall (2) about 1.5 mm thick, the exterior height of which is about 18 mm and the interior height of which is about 13 mm. Thus, the flat bottom (4) of the dish is about 5 mm in thickness. Around the interior of the dish about 8 mm from the wall are located 8 equidistant extremely sharp conical depressions (6) about 3 mm in diameter and about 3 mm in depth. Note: The test specimens are similar and the tree evaluation procedures are identical to those shown at columns 5 and 6 of U.S. Pat. No. 4,144,202.

In the test procedure, 25 mL of a 0.01N aqueous NaCl solution (3) is poured into the molded dish (1) and the dish is placed into a grounded bath (5), grounded here using a submerged screen (7) containing the same concentration NaCl solution (9). A 50 mm diameter platinum wire ring (11) is then immersed in the electrolyte in the dish and connected to the voltage source (13). Six such dishes are tested simultaneously. A schematic diagram of the test is shown in FIG. 1. Generally, 5 kilovolts (kV) at a frequency of about 8 kilohertz (kHz) was employed in the testing.

Following the test, the dish is removed from the apparatus, the electrolyte is poured out and the dish is washed and dried. A disc, as indicated at (8) in FIG. 2, is punched out from the portion of the dishes containing each conical depression and each disc is dyed for about 30–60 minutes with a boiling methylene blue solution in aqueous ammonia. The methylene blue solution is formed by dissolving 0.5 g of the dye in 250 mL of water containing 8 mL of concentrated ammonium hydroxide (28–30 weight percent ammonia). The discs are then sectioned and the section containing the tip of the cone is photomicrographed at 100 power.

Using the photomicrograph, each side of the tree for each section is measured in terms of millimeters, 1 measurement per side. The size of each specimen (8 sections) is the average of 16 measurements. In most of the specimens, the standard deviation is 10–20 percent of the average tree size.

The fundamental parameter which describes tree growth is the rate constant, k, defined by $$(dr)/(dt) = kE^2$$

where r is the instantaneous radius of the tree, t is the time in hours at which the measurement is taken and E is the electic field at the advancing front of the tree. Absolute values of k are not determined in our invention since small variations in applied voltage, exposure time and temperature can occur. Relative rate constants, $k_{rel}$, comparing the rate constant of the composition tested with that of a standard material, under the same conditions, are used in evaluating the effectiveness of any given tree growth inhibiting agent in this invention. The standard material is a commercially available low density polyethylene having a density of 0.92 (ASTM D1505) and a melt index of about 0.2 (ASTM D1238, condition E), containing no tree inhibiting agent.

EXAMPLE 1

A series of compositions was prepared by mixing a resinous polymer of ethylene with a treeing inhibitor, when employed. Ethylene polymers tested were all commercially available materials selected from a low density polyethylene (LDPE) having a nominal density of 0.921 g/cc and melt index of 0.21, a medium density polyethylene (MDPE) having a nominal density of 0.940 g/cc and melt index of 0.20 and a high density polyethylene (HDPE) having a nominal density of 0.963 g/cc and melt index of 0.30. In addition, a commercially made ethylene polymer composition containing a treeing inhibitor, believed to be 3 weight percent 1-dodecanol in LDPE, was employed for comparison.

The mixing procedure comprised dry blending the polymer in powder form (fluff) with the appropriate amount of treeing inhibitor plus about 0.03 weight percent, based on the total composition, of a two component stabilizing system such as 2,6-di-t-butyl-4-methylphenol and dilauryl thiodipropionate.

However, other conventional single and multicomponent stabilizing systems at levels ranging from about 0.01 to about 0.5 weight percent based on the total composition can be employed in place of the two component system used. Specific examples of such stabilizers include distearyl thiodipropionate, hindered phenols such as octadecyl[3-(3,5-di-t-butyl-4-hydroxyphenyl)]-propionate; di-n-octadecyl(3,5-di-t-butyl-4-hydroxybenzyl)phosphonate; 1,3,5-trimethyl-2,4,6-tris-(3,5-di-t-butyl-4-hydroxybenzyl)benzene; tris(3,5-di-t-butyl-4-hydroxybenzyl)isocyanurate and the like, hindered amines such as di(2,2,6,6-tetramethyl-4-piperidyl)sebacate; di-(1,2,2,6,6-pentamethyl-4-piperidyl)-2-n-butyl-2-(4-hydroxy-3,5-di-t-butyl-benzyl)malonate and the like and mixtures of 50° C.

The test specimens were subjected to treeing conditions at about 25° C. employing 5 kV at a frequency of 8.3 kHz for 24 hours.

The compositions made and the results obtained are set forth in Table I. For example, the composition employed in run 11 of Table I was prepared in a Henschel mixer by mixing 4900 g of the polymer fluff with 100 g of Standamul ®2428, 1 g of 2,6-di-t-butyl-4-methylphenol (BHT) and 0.5 g of dilauryl thiodipropionate for 5 minutes. The blend was then passed through an extruder equipped with a strand die at a melt temperature of 225° C., the strands were cooled and converted into pellets by revolving knives as known in the art. The pellets were then injection molded into dishes as previously described using a mold temperature of 50° C.

The test specimens were subjected to treeing conditions at about 25° C. employing 5 kV at a frequency of 8.3 kHz for 24 hours.

The compositions made and the results obtained are set forth in Table 1.

TABLE 1

| | Water Treeing Resistance of Extruder Mixed Polyethylene Composition | | | | |
|---|---|---|---|---|---|
| Run No | Polyethylene | Treeing Inhibitor Name | Wt % | Av. Tree Length, mm | Relative Rate Constant $k_{rel}^{(a)}$ |
| 1 (control) | LDPE | None | — | 363 | 1.00 |
| 2 (control) | MDPE | None | — | 239 | 0.36 |

TABLE 1-continued

Water Treeing Resistance of
Extruder Mixed Polyethylene Composition

| Run No | Polyethylene | Treeing Inhibitor Name | Wt % | Av. Tree Length, mm | Relative Rate Constant $k_{rel}$[a] |
|---|---|---|---|---|---|
| 3 (control) | HDPE | None | — | 191 | 0.21 |
| 4 (comparison) | LDPE | 1-dodecanol | — | 27.0 | 0.0013 |
| 5 (comparison) | MDPE | 1-dodecanol | 3 | 58.0 | 0.012 |
| 6 (comparison) | MDPE | 1-octadecanol | 4 | 118 | 0.061 |
| 7 (invention) | MDPE | 2-octylundecanol-1 | 2 | 173 | 0.26 |
| 8 (invention) | MDPE | 2-octyldodecanol-1 | 2 | 136 | 0.11 |
| 9 (invention) | MDPE | 2-octyldodecanol-1 | 4 | 63.2 | 0.016 |
| 10 (invention) | MDPE | Standamul ® 2428[b] | 2 | 265 | 0.75 |
| 11 (invention) | MDPE | Standamul ® 2428[b] | 4 | 121 | 0.065 |

[a] $k_{rel}$ for LDPE control is arbitrarily assigned a value of 1.00.
[b] Henkel Inc., Fort Lee, N.J. A mixture of $C_{24,26,28}$ 2-alkanols.

The results in Table I for control runs 1–3 show the effect of polymer density on water treeing resistance of polyethylene absent any long chain 2 alkylalkanol inhibitors. Treeing resistance increases with polymer density, LDPE being most susceptible, HDPE being least susceptible, and MDPE intermediate but more nearly like HDPE. However, the relatively high stiffness and relatively low environmental stress cracking resistance of HDPE makes it less attractive as a dielectric for power cables compared to its lower density counterparts.

Comparison run 5 shows the result obtained with a commercially available polyethylene resin containing a treeing inhibitor. Good results are shown, however, the material employed as treeing inhibitor is less effective in applications where moderately high temperatures, e.g., about 60° to 100° C. or more, are encountered and, as a result, treeing resistance is lessened. This is shown later in Table 3, run 2.

Comparison runs 5, 6 show that 1-alkanols containing from 12 to 18 carbons can provide good treeing resistance in MDPE. However, the 18 carbon alkanol appears to be less effective than the 12 carbon alkanol in this test. Both alkanols are also less effective as treeing inhibitors where moderate temperatures are encountered. This is shown later in Table 3, run 3, with the 12 carbon alkanol.

Invention runs 7–11 demonstrate that 2-alkylalkanols having a total of 19 to 28 carbon atoms are effective treeing inhibitors in this test with the best results obtained with compositions containing about 4 weight percent inhibitor.

EXAMPLE 2

Polyethylene compositions were prepared from portions of the same base MDPE used before. In this instance, the samples were mixed in a Brabender Plastograph for 5 minutes at 185° C. under a nitrogen atmosphere. Stabilizers (antioxidants) were not employed. Each mixture was then converted into the test dishes by injection molding.

The dishes were tested for treeing resistance for 24 hours at 25° C. employing 5 kV at a frequency of 7.78 kHz.

The compositions made and the results obtained are given in Table 2.

TABLE 2

Water Treeing Resistance of Polyethylene Compositions

| Run No | Polyethylene | Treeing Inhibitor Name | Wt % | Av. Tree Length, mm | Relative Rate Constant $K_{rel}$ |
|---|---|---|---|---|---|
| 1 (control) | MDPE | None | — | 234 | 1.00 |
| 2 (invention) | MDPE | Standamul ® 2428 | 1 | 119 | 0.18 |
| 3 (invention) | MDPE | Standamul ® 2428 | 2 | 128 | 0.22 |
| 4 (invention) | MDPE | Standamul ® 2428 | 4 | 88 | 0.083 |
| 5 (comparison) | MDPE | 13-hexacosanol | 2 | 203 | 0.70 |

Invention runs 2–4 again show that the 24 to 28 carbon 2-alkylalkanols are effective treeing inhibitors in MDPE and corroborate the results in Table 1.

Comparison run 5 shows that the 26 carbon secondary alkanol employed as treeing inhibitor is considerably less effective than the primary 2-alkylalkanols of comparable carbon atoms lengths.

EXAMPLE 3

Polyethylene compositions were prepared from portions of the same base MDPE used before, employing identical mixing and molding techniques.

However, in this example, the dishes were conditioned in a forced air circulating oven for 44 hours at 75° C. and for about 68 hours at 90° C.

The thermally conditioned dishes were then subjected to treeing conditions at 25° C. employing 5 kV at a frequency of 8.3 kHz.

The compositions made and the results obtained are set forth in Table 3.

TABLE 3
Water Treeing Resistance of Thermally Conditioned Polyethylene Compositions

| Run No | Polyethylene | Treeing Inhibitor Name | Wt % | Av. Tree Length, um | Relative Rate Constant $K_{rel}$ |
|---|---|---|---|---|---|
| 1 (control) | LDPE | None | — | 244 | 1.00 |
| 2 (comparison) | LDPE | 1-dodecanol | — | 189 | 0.53 |
| 3 (comparison) | MDPE | 1-dodecanol | 3 | 206 | 0.66 |
| 4 (invention) | MDPE | 2-octyldodecanol | 2 | 113 | 0.14 |
| 5 (invention) | MDPE | Standamul ® 2428 | 4 | 144 | 0.27 |

Comparison runs 2,3 show the deleterious effects of thermally conditioning the compositions prior to subjecting them to treeing conditions. It is believed that the 10 and 12 carbon alkanols employed as treeing inhibitors are relatively volatile under the conditions used. Consequently, the compositions are made more susceptible to treeing formation.

This behavior is also shown in invention runs 4,5 with the primary 2-alkylalkanols but to a substantially lower degree.

We claim:

1. A method for inhibiting formation of water trees in objects formed from compositions of polymers of ethylene used in dielectric applications comprising admixing a polymer of ethylene having a density in a range above about 0.92 g/cc as determined by ASTM D1505 with an amount of an aliphatic, primary, monohydric, branched chain alkanol of about 9 to about 30 carbon atoms sufficient to inhibit formation of water trees in objects formed from compositions of polymers of ethylene used in dielectric applications, said alkanol defined by the formula $$RCH_2CHCH_2OH$$
$$R'$$

wherein R and R' are the same or different linear or branched chain alkyl groups with each group containing from about 3 to about 20 carbon atoms.

2. A method of claim 1 wherein said polymer of ethylene has a density in a range of about 0.935 to about 0.960 g/cc.

3. A method of claim 1 wherein R and R' are such that the total number of carbons atoms in R and R' together can range from about 12 to about 27.

4. A method of claim 3 wherein said alkanols are chosen from among 2-butyloctanol-1,2-heptyldodecanol-1,2-octylundecanol-1,2-octyldodecanol-1,2-decyldodecanol-1,2-dodecyloctadecanol-1,2-octyleicosanol-1, and mixtures thereof.

5. A method of claim 1 wherein the amount of said alkanol is about 0.5 to about 10 weight percent of the total composition.

6. A method of claim 2 wherein the amount of said alkanol is about 0.5 to about 10 weight percent of the total composition.

7. A method of claim 5 wherein the amount of said alkanol is about 1.5 to about 5 weight percent of the total composition.

8. A method of claim 6 wherein the amount of said alkanol is about 1.5 to about 5 weight percent of the total composition.

9. A composition of polymer of ethylene resistant to forming of water trees in objects formed from compositions of polymers of ethylene used in dielectric applications comprising polymer of ethylene having a density in a range above 0.92 g/cc as determined by ASTM D1505 and an amount of an aliphatic, primary, monohydric, branched chain alkanol of about 9 to about 30 carbon atoms, said amount sufficient to inhibit formation of water trees in objects formed from compositions of polymers of ethylene used in dielectric applications, said alkanol defined by the formula $$RCH_2CHCH_2OH$$
$$R'$$

wherein R and R' are the same or different linear or branched chain alkyl groups with each group containing from about 3 to about 20 carbon atoms.

10. The composition of claim 9 wherein the density range of the polymer of ethylene is about 0.935 to about 0.960 g/cc.

11. A composition of claim 9 wherein R and R' are such that the total number of carbon atoms in R and R' together can range from about 12 to about 27.

12. A composition of claim 11 wherein said alkanols are chosen from among 2-butyloctanol-1,2-heptyldodecanol-1,2-octylundecanol-1,2-octyldodecanol-1,2-decyldodecanol-1,2-dodecyloctadecanol-1,2-octyleicosanol-1, and mixtures thereof.

13. A composition of claim 9 wherein the amount of alkanol is in a range of about 0.5 to about 10 weight percent of the total composition.

14. A composition of claim 10 wherein the amount of said alkanol is about 0.5 to about 10 weight percent of the total composition.

15. A composition of claim 13 wherein the amount of said alkanol is in a range of about 1.5 to about 5 weight percent of the total composition.

16. A composition of claim 14 wherein the amount of said alkanol is in a range of about 1.5 to about 5 weight percent of the total composition.

* * * * *